United States Patent
Sakuta et al.

(10) Patent No.: US 9,990,032 B2
(45) Date of Patent: Jun. 5, 2018

(54) IMAGE PROCESSING FOR GENERATING A DISPLAY IMAGE BASED ON ORIENTATION INFORMATION AND AN ANGLE OF VIEW

(71) Applicant: SONY CORPORATION, Tokyo (JP)

(72) Inventors: Mariko Sakuta, Tokyo (JP); Yoichi Hirota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/413,886

(22) Filed: Jan. 24, 2017

(65) Prior Publication Data

US 2017/0131763 A1   May 11, 2017

Related U.S. Application Data

(63) Continuation of application No. 14/568,559, filed on Dec. 12, 2014, now Pat. No. 9,582,073.

(30) Foreign Application Priority Data

Dec. 25, 2013 (JP) ................. 2013-268016

(51) Int. Cl.
G09G 5/00 (2006.01)
G06F 3/01 (2006.01)
G06F 3/0346 (2013.01)
G06F 1/16 (2006.01)

(52) U.S. Cl.
CPC ............... G06F 3/012 (2013.01); G06F 1/163 (2013.01); G06F 3/0346 (2013.01)

(58) Field of Classification Search
CPC ........ G06F 3/012; G06F 1/163; G06F 3/0346; G06F 3/0488; G06F 2203/0381; G02B 27/017; G02B 2027/0147; G02B 2027/0187; G02B 2027/014
See application file for complete search history.

(56) References Cited

U.S. PATENT DOCUMENTS

| | | | | |
|---|---|---|---|---|
| 5,959,597 A | * | 9/1999 | Yamada | G02B 27/017 345/7 |
| 2007/0296646 A1 | * | 12/2007 | Yamamoto | G02B 27/017 345/8 |
| 2008/0297437 A1 | * | 12/2008 | Takahashi | G02B 27/017 345/8 |
| 2009/0058845 A1 | * | 3/2009 | Fukuda | B60K 35/00 345/214 |

(Continued)

FOREIGN PATENT DOCUMENTS

JP   09-106322 A   4/1997
JP   2010-256534 A   11/2010

(Continued)

*Primary Examiner* — Claire X Pappas
*Assistant Examiner* — Gerald Oliver
(74) *Attorney, Agent, or Firm* — Chip Law Group

(57) ABSTRACT

An image processing device includes an orientation information acquisition unit which acquires orientation information of a head portion of a user that observes a display image of a display device; an angle of view switching unit which switches an angle of view of the display image; a rendering process unit which generates the display image based on the orientation information and the angle of view; and a transmission unit which transmits the generated image to the display device.

20 Claims, 17 Drawing Sheets

(56) References Cited

U.S. PATENT DOCUMENTS

| | | | | |
|---|---|---|---|---|
| 2010/0002071 A1* | 1/2010 | Ahiska | ............... | H04N 5/217 |
| | | | | 348/36 |
| 2010/0149399 A1* | 6/2010 | Mukai | ............... | G01C 21/20 |
| | | | | 348/333.02 |
| 2012/0075166 A1* | 3/2012 | Marti | ............... | G06F 3/011 |
| | | | | 345/1.1 |
| 2013/0100123 A1* | 4/2013 | Hakoda | ............... | H04N 13/0022 |
| | | | | 345/419 |
| 2013/0260360 A1* | 10/2013 | Baurmann | ............... | G06F 3/14 |
| | | | | 434/365 |

FOREIGN PATENT DOCUMENTS

| | | |
|---|---|---|
| JP | 4946730 B2 | 3/2012 |
| JP | 2012-141461 A | 7/2012 |
| JP | 2012-252389 A | 12/2012 |

* cited by examiner

FIG. 5
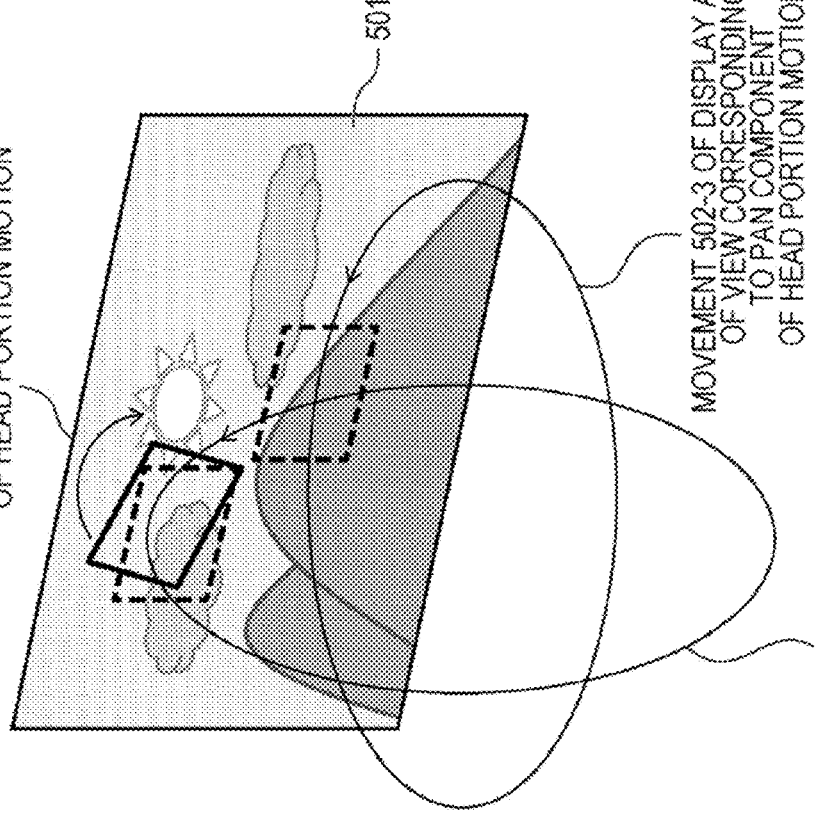
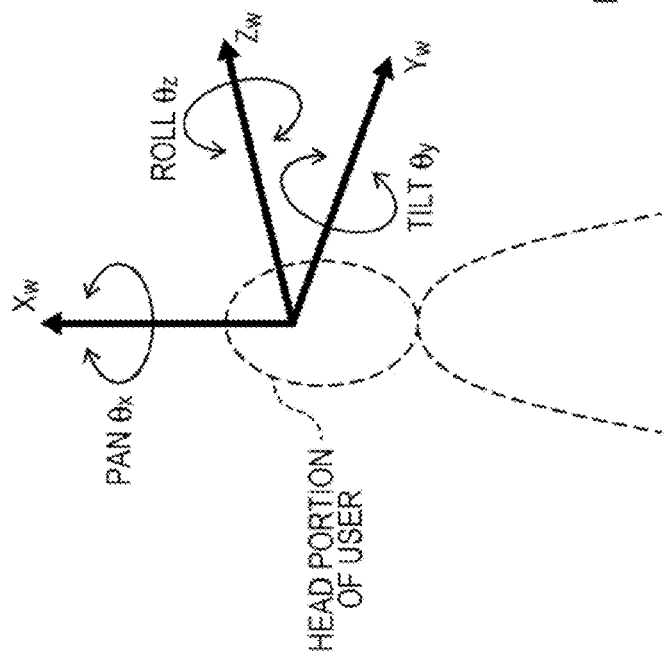

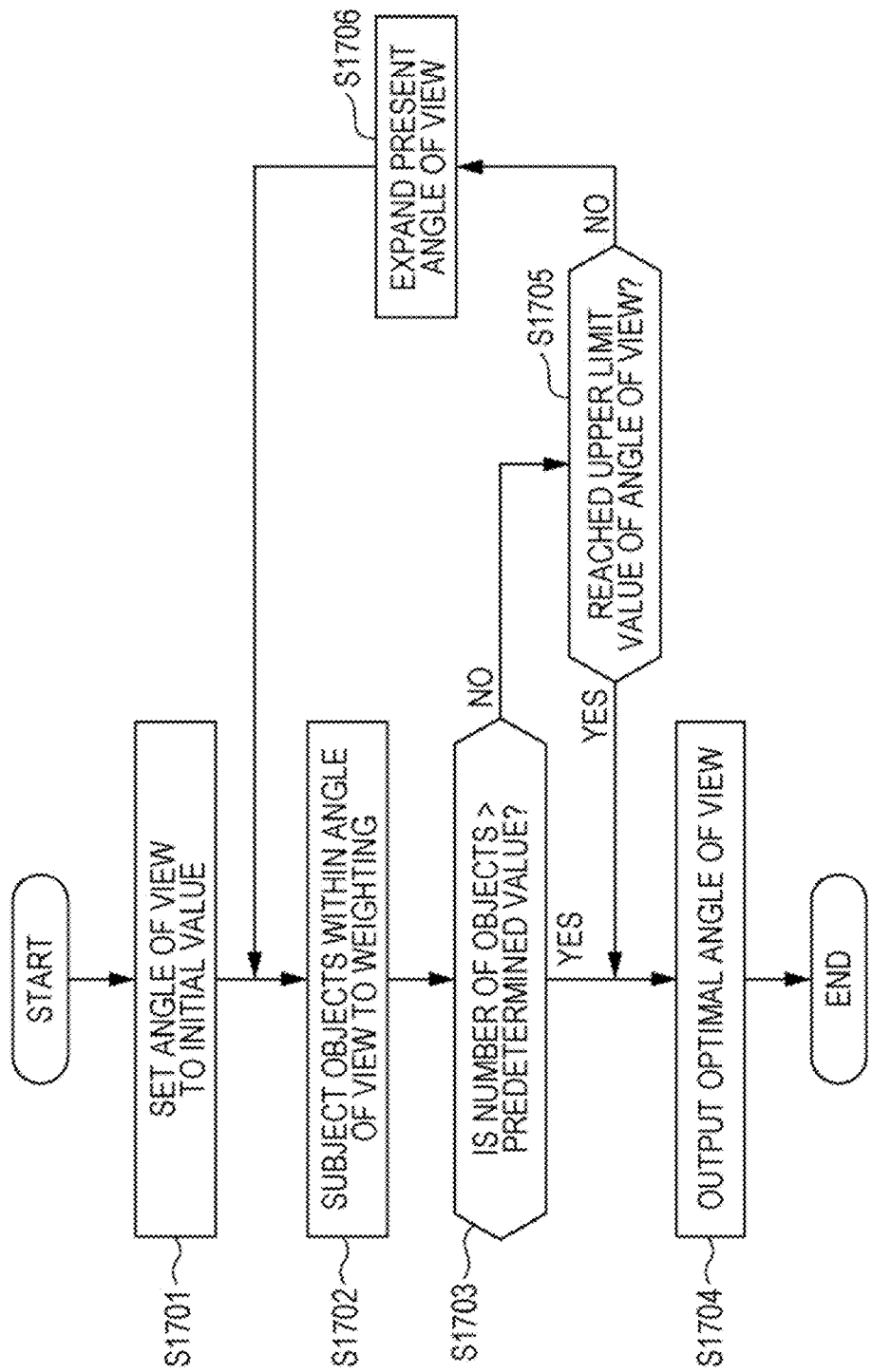

IMAGE PROCESSING FOR GENERATING A DISPLAY IMAGE BASED ON ORIENTATION INFORMATION AND AN ANGLE OF VIEW

CROSS REFERENCE TO RELATED APPLICATIONS

The present application is a continuation application of U.S. patent application Ser. No. 14/568,559, filed Dec. 12, 2014, which claims the benefit of priority from prior Japanese Priority Patent Application JP 2013-268016 filed in the Japan Patent Office on Dec. 25, 2013, the entire content of which is hereby incorporated by reference. Each of the above-referenced applications is hereby incorporated herein by reference in its entirety.

BACKGROUND

The technology disclosed in the present specification relates to an image processing device and an image processing method which process an image that tracks the movement of the head portion of a user. The technology also relates to a display device and a display method which display the image that tracks the movement of the head portion of the user. In addition, the technology relates to a computer program, and to an image display system.

An image display device that is fixed to the head portion or a face portion of the user that observes the image, that is, a head mounted display is known. The head mounted display has an image display unit for both right and left eyes, for example, is used together with headphones, and is configured to be capable of controlling the senses of sight and sound. If the head mounted display is configured to completely block out the outside world when mounted on the head portion, the virtual reality feeling is increased during viewing. The head mounted display is capable of showing different pictures for the right and left eyes, and if images with parallax in relation to the right and left eyes are displayed, it is possible to present a 3D image.

This type of head mounted display causes a virtual image to form on the retina of the eye to allow the user to observe the image. Here, when an object is in a position closer to the lens than the focal length, the virtual image is formed on the side of the object. For example, there is proposed a head mounted display in which a virtual image optical system with a wide angular field of view is disposed distanced only 25 millimeters in front of the pupil, a display panel with an effective pixel range of a size of approximately 0.7 inches is disposed further in front of the wide angular field of view optical system, and an enlarged virtual image of a display image is formed on the pupil of the user (for example, refer to Japanese Unexamined Patent Application Publication No. 2012-141461).

Using this type of head mounted display, the user can observe an image that is obtained by cutting out a portion of a wide angle image. For example, there is proposed a head mounted display in which a head portion action tracking device formed of a gyroscope or the like is attached to the head portion and a user can perceive a picture of 360° of full space which tracks the movement of the head portion of the user (for example, refer to Japanese Unexamined Patent Application Publication No. 9-106322 and Japanese Unexamined Patent Application Publication No. 2010-256534). By causing a display region within a wide angle image to move so as to cancel out the movement of the head portion that is detected by the gyroscope, it is possible to reproduce an image which tracks the movement of the head portion, and the user experiences looking over the full space.

SUMMARY

It is desirable to provide an image processing device and an image processing method, a display device and a display method, a computer program, and an image display system, all of which are excellent and capable of presenting an image that tracks the movement of the head portion of a user.

According to an embodiment of the present disclosure, there is provided an image processing device which includes an orientation information acquisition unit which acquires orientation information of a head portion of a user that observes a display image of a display device; an angle of view switching unit which switches an angle of view of the display image; a rendering process unit which generates the display image based on the orientation information and the angle of view; and a transmission unit which transmits the generated image to the display device.

In the embodiment, the display device may be used fixed to a head portion or a face portion of the user.

In the embodiment, the orientation information acquisition unit of the image processing device may receive the orientation information from an orientation detection device which detects an orientation of the head portion of the user.

In the embodiment, the rendering process unit of the image processing device may generate the display image by cutting out a region corresponding to the angle of view from a position corresponding to the orientation information of an original image.

In the embodiment, the image processing device may further include a user operation unit which the user operates. The angle of view switching unit may switch the angle of view according to an operation performed by the user in relation to the user operation unit.

In the embodiment, the user operation unit of the image processing device may include a touch panel. The angle of view switching unit may switch the angle of view according to a touch operation performed by the user in relation to the touch panel.

In the embodiment, the angle of view switching unit of the image processing device may switch alternately to one of a first angle of view and a second angle of view every time the user touches the touch panel.

In the image processing device, the angle of view switching unit may set the first angle of view and the second angle of view to fixed values.

In the embodiment, the angle of view switching unit of the image processing device may determine the first angle of view based on a resolution of the display device, and may determine the second angle of view based on the resolution of the display device and the resolution of an original image to be processed by the rendering process unit.

In the embodiment, the angle of view switching unit of the image processing device may determine an angle of view based on feature values of an original image.

In the embodiment, the angle of view switching unit of the image processing device may determine the smallest angle of view at which a total number of objects exceeds a predetermined value.

In the embodiment, the angle of view switching unit of the image processing device may determine the smallest angle of view at which a weighted sum value of objects exceeds a predetermined value.

According to another embodiment of the present disclosure, there is provided an image processing method which includes acquiring orientation information of a head portion of a user that observes a display image of a display device; switching an angle of view of the display image; generating the display image based on the orientation information and the angle of view; and transmitting the generated image to the display device.

According to still another embodiment of the present disclosure, there is provided a display device which includes a display unit; an orientation information acquisition unit which acquires orientation information of a head portion of a user that observes a display image of the display unit; an angle of view switching unit which switches an angle of view of the display image; and a rendering process unit which generates the display image based on the orientation information and the angle of view.

In the embodiment, the display device may further include a user operation unit which the user operates. The angle of view switching unit may switch the angle of view according to an operation performed by the user in relation to the user operation unit.

In the embodiment, the angle of view switching unit of the display device may switch alternately to one of a first angle of view and a second angle of view every time a user operation is performed.

According to still another embodiment of the present disclosure, there is provided a display method which includes acquiring orientation information of a head portion of a user that observes a display image of a display unit; switching an angle of view of the display image; and generating the display image based on the orientation information and the angle of view.

According to still another embodiment of the present disclosure, there is provided a computer program denoted in a computer readable format for causing a computer to function as an orientation information acquisition unit which acquires orientation information of a head portion of a user that observes a display image of a display device; an angle of view switching unit which switches an angle of view of the display image; a rendering process unit which generates the display image based on the orientation information and the angle of view; and a transmission unit which transmits the generated image to the display device.

According to still another embodiment of the present disclosure, there is provided a computer program denoted in a computer readable format for causing a computer to function as a display unit; an orientation information acquisition unit which acquires orientation information of a head portion of a user that observes a display image of the display unit; an angle of view switching unit which switches an angle of view of the display image; and a rendering process unit which generates the display image based on the orientation information and the angle of view.

The computer programs according to the above-described embodiments of the present technology are defined as computer programs written in a computer readable format so as to realize predetermined processes on a computer. In other words, by installing the computer programs of the above-described embodiments of the present technology on a computer, a cooperative operation is exhibited on the computer and it is possible to obtain the same operational effects as the image processing device according to an embodiment of the present technology and as the display device according to an embodiment of the present technology.

According to still another embodiment of the present disclosure, there is provided an image display system which includes a display device which displays an image; a head portion action tracking device which measures an orientation of a head portion of a user that observes a display image of the display device; and a rendering device which switches an angle of view at which the display device displays an image, and generates an image based on the orientation information and the angle of view.

However, here, the term "system" refers to a logical collection of a plurality of devices (or function modules which realize specific functions), and each device or function module may or may not be present inside a single housing.

According to the embodiment of the technology disclosed in the present specification, it is possible to provide an image processing device and an image processing method, a display device and a display method, a computer program, and an image display system, all of which are excellent and capable of appropriately processing an image that tracks the movement of the head portion of a user.

According to the embodiments of the technology disclosed in the present specification, the angle of view of an image to be cut out from a position corresponding to the orientation information of the head portion of the user in a full spherical image or a wide angle original image such as a 4K image can be switched as appropriate. Therefore, the user can efficiently view a wide angle image by switching to a narrow angle of view when the user wishes to focus on and observe a specific narrow region within the original image, and switching to a wide angle of view when the user wishes to understand the state of the original image in general.

The effects described in the present specification are merely examples, and the effects of an embodiment of the present disclosure are not limited thereto. There is a case in which an embodiment of the present disclosure further has additional effects other than those described above.

Furthermore, other objects, characteristics, and advantages of an embodiment of the technology disclosed in the present specification will be clarified by detailed description based on the embodiments and the accompanying drawings described below.

BRIEF DESCRIPTION OF THE DRAWINGS

FIG. 5 is a diagram for explaining how the display device displays an image which tracks the movement of the head portion of a user in the image display system illustrated in FIG. 1 or 2;

FIG. 17 is a flowchart illustrating the procedure for the angle of view switching unit to determine an angle of view that is optimal for the original image based on a total value which is a weighted sum of objects.

DETAILED DESCRIPTION OF EMBODIMENTS

Embodiments of the technology disclosed in the present specification will be described in detail below with reference to the drawings.

Figure 1:
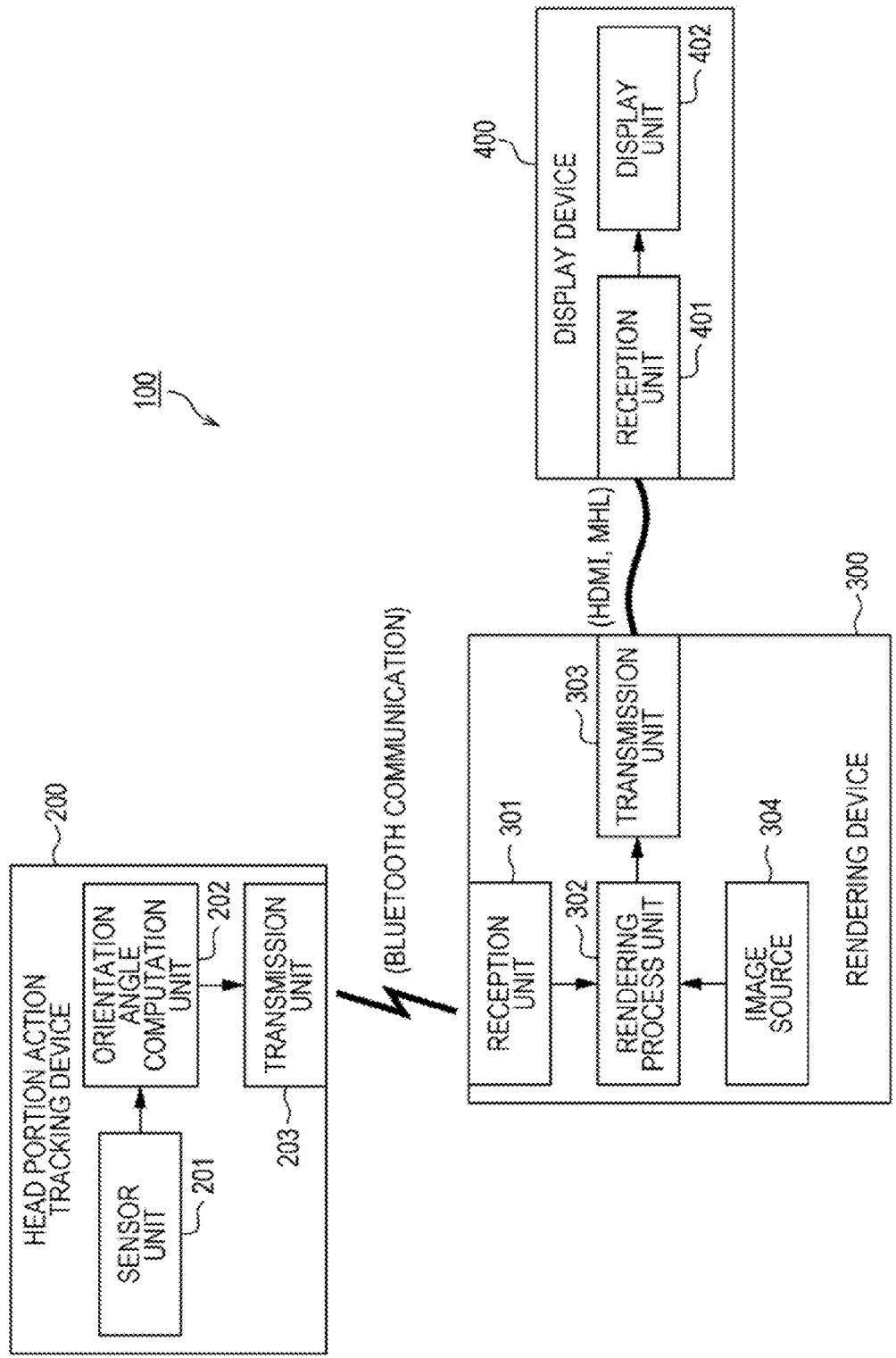
FIG. 1 is a diagram schematically illustrating a configuration example of an image display system to which an embodiment of the technology disclosed in the present specification is applied.

FIG. 1 schematically illustrates a configuration example of an image display system 100 to which an embodiment of the technology disclosed in the present specification is applied. The image display system 100 illustrated in FIG. 1 is configured to include a head portion action tracking device 200, a rendering device 300, and a display device 400.

The head portion action tracking device 200 is used by being mounted on the head portion of the user that observes an image displayed by the display device 400, and outputs orientation information of the head portion of the user to the rendering device 200 at a predetermined transmission period. In the example illustrated in FIG. 1, the head portion action tracking device 200 is provided with a sensor unit 201, an orientation angle computation unit 202, and a transmission unit 203 which transmits the obtained orientation information to the rendering device 300.

The sensor unit 201 is configured, for example, by combining a plurality of sensors such as a gyroscope, an accelerometer, and a magnometer. Here, the sensor unit 201 is a sensor capable of detecting a total of nine axes from a three axes gyroscope, a three axes accelerometer, and a three axes magnometer. The orientation angle computation unit 202 computes the orientation information of the head portion of the user based on the nine axes detection results obtained by the sensor unit 201. The transmission unit 203 transmits the obtained orientation information to the rendering device 300.

In the image display system 100 illustrated in FIG. 1, the head portion action tracking device 200 and the rendering device 300 are connected to each other by wireless communication such as Bluetooth (registered trademark) communication. Naturally, the head portion action tracking device 200 and the rendering device 300 may be connected to each other via a high-speed wired interface such as Universal Serial Bus (USB) instead of wireless communication.

The rendering device 300 renders an image that is displayed on the display device 400. The rendering device 300 is configured as a terminal with Android (registered trademark) installed thereon such as a smart phone, or as a personal computer or a game device, for example; however, the rendering device 300 is not limited to these devices.

In the example illustrated in FIG. 1, the rendering device 300 is provided with a reception unit 301, a rendering process unit 302, a transmission unit 303, and an image source 304. The reception unit 301 receives the orientation information from the head portion action tracking device 200, the rendering process unit 302 renders an image based on the orientation information, the transmission unit 303 transmits the rendered image to the display device 400, and the image source 304 serves as the supply source of image data.

The reception unit 301 receives orientation information from the head portion action tracking device 200 via Bluetooth (registered trademark) communication or the like. The orientation information is expressed as a rotation matrix.

For example, the image source 304 is formed of a storage device such as a Hard Disc Drive (HDD) or a Solid State Drive (SSD) that records image content, a medium reproduction device that reproduces a recorded medium such as a Blu-ray (registered trademark), a broadcast tuner which selectively receives a digital broadcast signal, or a communication interface that receives image content from a server on the Internet or the like.

The rendering process unit 302 renders an image, which is displayed on the display device 400 side, from image data of the image source 304. For example, the rendering process unit 302 renders an image obtained by cutting out a display angle of view, which corresponds to the orientation information that is received by the reception unit 301, from a full spherical original image or a wide angle of view original image of 4K or the like that is supplied from the image source 304.

The rendering device 300 and the display device 400 are connected to each other using a wired cable such as High Definition Multimedia Interface (HDMI, registered trademark) or Mobile High-definition Link (MHL). Alternatively, the rendering device 300 and the display device 400 may be connected to each other using wireless communication such as wireless HD or Miracast. The transmission unit 303 transmits the image data that is rendered by the rendering process unit 302 as it is in a non-compressed state to the display device 400 using one of the communication paths.

The display device 400 is provided with a reception unit 401 that receives images from the rendering device 300, and a display unit 402 that displays the received images. The image display device 400 is configured as a head mounted display that is fixed to the head portion or the face portion of the user that observes the image, for example.

The reception unit 401 receives the non-compressed image data from the rendering device 300 via a communication path such as HDMI (registered trademark) or MHL. The display unit 402 displays the received image data on the screen.

When the display device 400 is configured as a head mounted display, for example, the display unit 402 is provided with right and left screens which are respectively fixed to the right and left eyes of the user, and displays a left eye image and a right eye image. The screen of the display unit 402 is configured of, for example, a display panel such as a micro display such as organic Electro-Luminescence (EL) elements or a liquid crystal display, or alternatively, a laser scanning display such as a retinal scan display. Furthermore, a virtual image optical unit which forms an enlarged virtual image that is formed from a predetermined angle of view on the pupil of the user by enlarging and projecting the display image of the display unit 402 is provided.

An image that is obtained by cutting out a display angle of view, which corresponds to the orientation information of the head portion of the user, from a full spherical original image or a wide angle of view original image of 4K or the like is rendered at the rendering device 300 side. At the display device 400 side, the display region within the original image moves so as to cancel out the orientation angle of the head portion of the user. Therefore, it is possible to reproduce an image that tracks the movement of the head portion, and the user can experience looking over a large screen. The display device 400 may be configured to change the output of audio to match the movement of the image.

Figure 2:
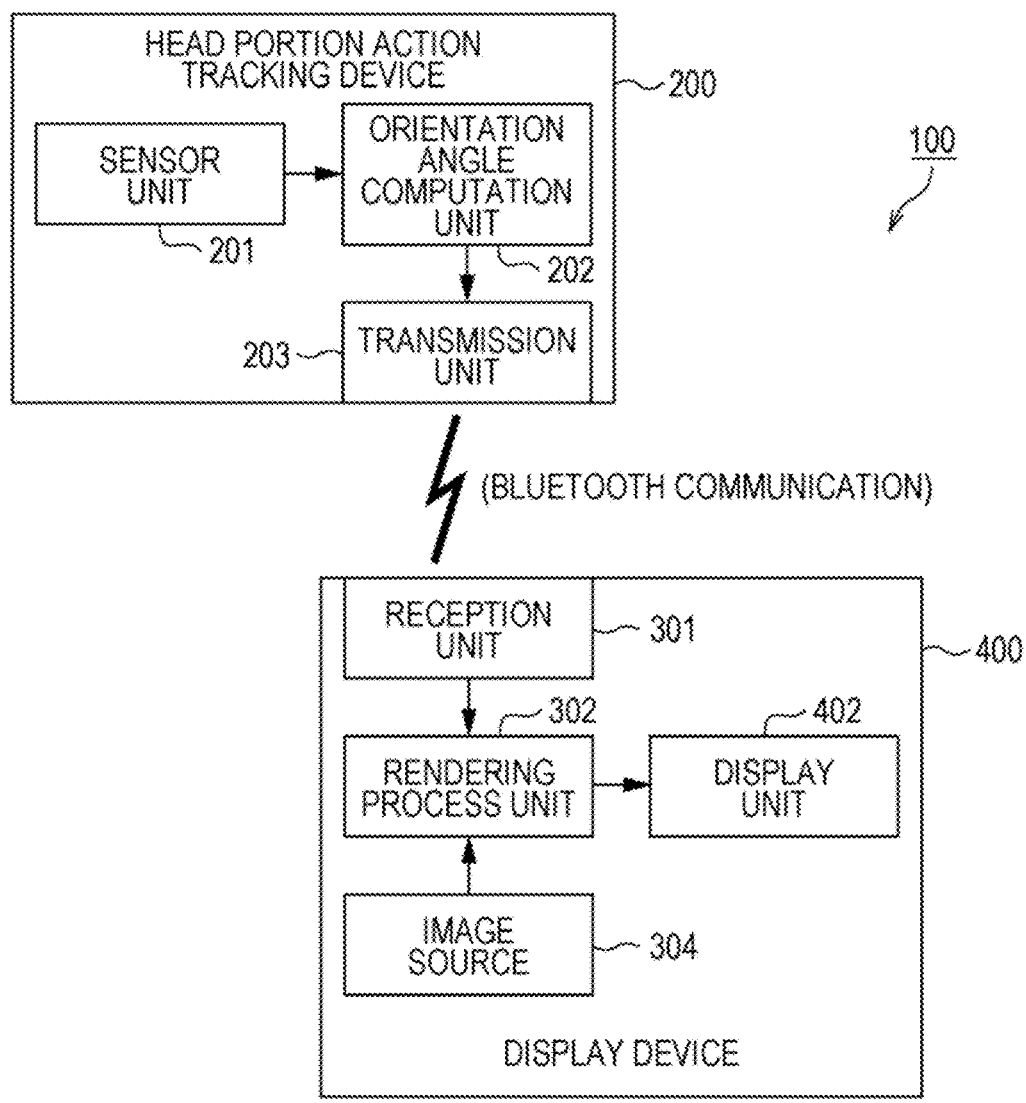
FIG. 2 is a diagram schematically illustrating a modification example of the image display system.

FIG. 2 schematically illustrates a modification example of the image display system 100. In the example illustrated in FIG. 1, the image display system 100 is configured using three independent devices, the head portion action tracking device 200, the rendering device 300, and the display device 400; however, in the example illustrated in FIG. 2, the function of the rendering device 300 is installed in the display device 400. As illustrated in FIG. 1, if the head portion action tracking device 200 is configured as an optional product that is externally attached to the display device 400, the display device 400 is reduced in size, weight, and cost.

Figure 3:
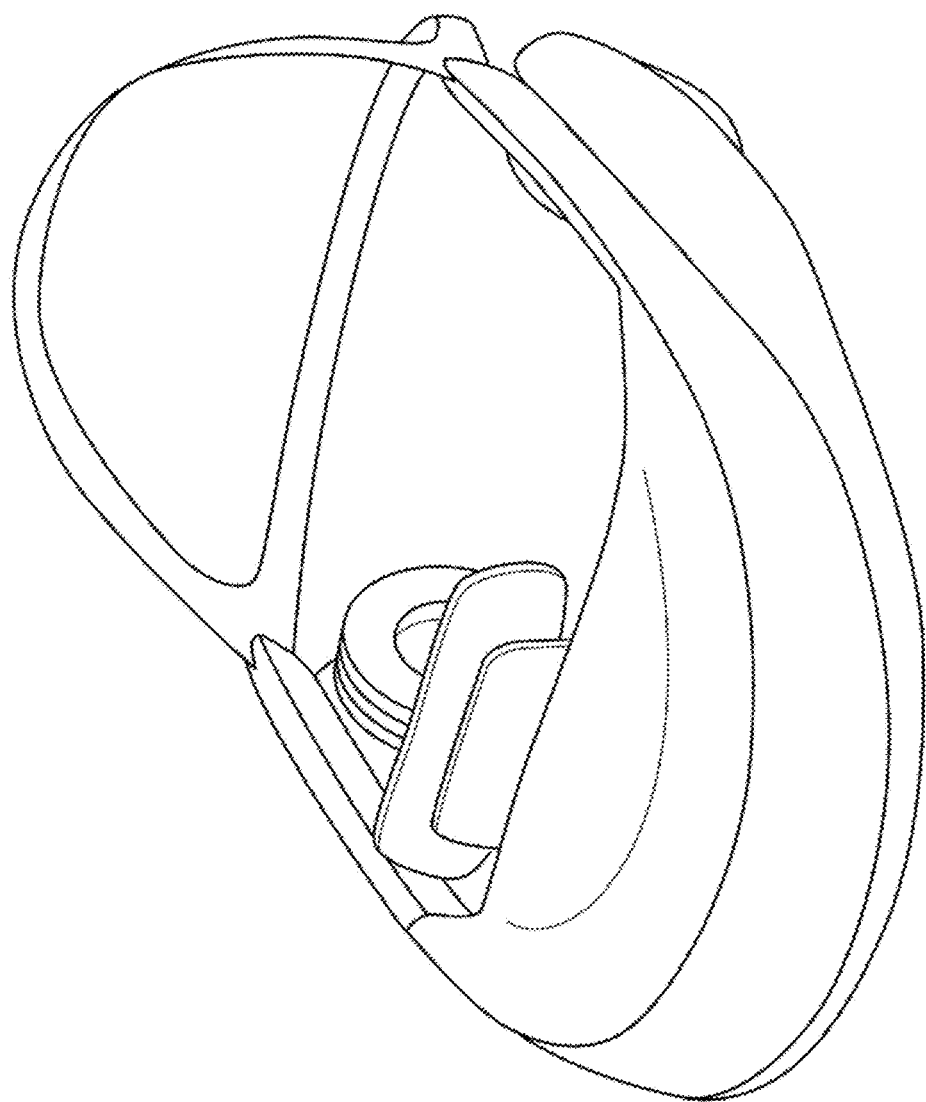
FIG. 3 is a diagram (a perspective view) illustrating the configuration relating to the appearance of a display device.
Figure 4:
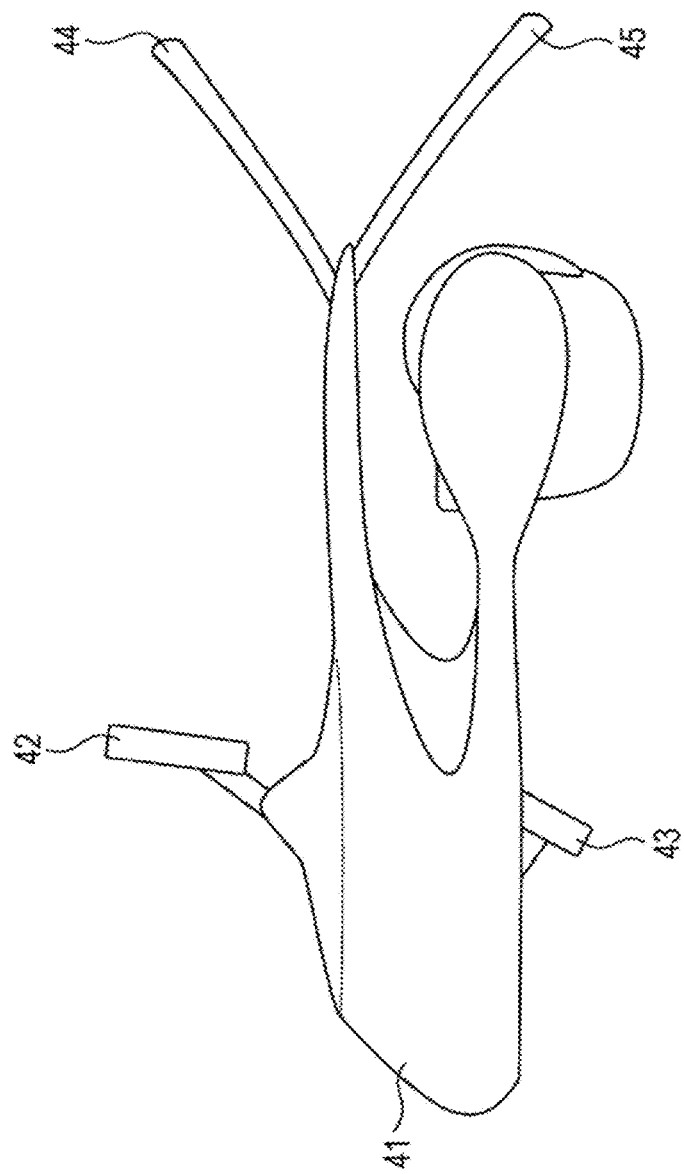
FIG. 4 is a diagram (a left side view) illustrating the configuration relating to the appearance of the display device.

FIGS. 3 and 4 illustrate the configuration relating to the appearance of the display device 400. In the example illustrated in the drawings, the display device 400 is configured as a head mounted display that is fixed to the head portion or the face portion of the user that observes the image. However, whereas FIG. 3 is a perspective view of the head mounted display, FIG. 4 is a left side view of the head mounted display.

The display device 400 illustrated in the drawings is a head mounted display with a hat-shaped structure or a structure of a belt shape that surrounds the whole circumference of the head portion. The head mounted display can be worn with reduced load on the user by distributing the weight load of the device over the entire head portion.

The display device 400 is formed of a main body portion 41, a forehead rest portion 42, a head band and right and left headphones. The main body portion 41 contains most of the parts including the display system, the forehead rest portion 42 protrudes from the upper surface of the main body portion 41, and the head band splits into an upper band 44 and a lower band 45. A display unit and a circuit board are stored inside the main body portion 41. A nose rest portion 43 is formed below the main body portion 41 so as to conform to the dorsum of the nose of the user.

When the user mounts the display device 400 on the head portion, the forehead rest portion 42 abuts the forehead of the user, and the upper band 44 and the lower band 45 of the head band both abut the rear of the head portion. In other words, the display device 400 is mounted on the head portion of the user using the three-point support of the forehead rest portion 42, the upper band 44, and the lower band 45. Therefore, unlike a normal eyeglass structure which mainly supports the weight with the nose rest portion, the display device 400 can be worn with reduced load on the user by distributing the weight load over the entire head portion. The display device 400 illustrated in the drawings is also provided with the nose rest portion 43; however, the nose rest portion 43 only contributes auxiliary support. By fastening the forehead rest portion 42 to the head band, it is possible to support movement in the rotational direction such that the display device 400 does not rotate from the head portion of the user wearing the display device 400.

The head portion action tracking device 200 can be installed within the main body portion 41 of the display device 400 which is configured as the head mounted display. However, in the present embodiment, the head portion action tracking device 200 is provided as an optional product that is externally attached to the display device 400 with the intention of reducing the size, weight, and cost of the display device 400. The head portion action tracking device 200 is attached at the location of one of the upper band 44, the lower band 45, the forehead rest portion 42 or the like of the display device 400 and is used as an accessory, for example.

FIG. 5 explains how the display device 400 displays an image which tracks the movement of the head portion of the user in the image display system 100 illustrated in FIG. 1 or 2.

The line of sight of the user is a zw axis, the horizontal direction is a yw axis, the vertical direction is a xw axis, the origin point of the reference axes xwywzw of the user is at the viewpoint position of the user. Therefore, roll $\theta z$ corresponds to the motion around the zw axis of the head portion of the user, tilt $\theta y$ corresponds to the motion around the yw axis of the head portion of the user, and pan $\theta z$ corresponds to the motion around the xw axis of the head portion of the user.

The head portion action tracking device 200 detects orientation information formed of the movement of the head portion of the user in the roll, tilt, and pan directions ($\theta z$, $\theta y$, $\theta z$) and the horizontal movement of the head portion, and outputs the orientation information to the rendering device 300 as a rotation matrix MR.

The rendering device 300 renders an image of a region 502 obtained by moving the center of the region 502 to be cut out from a full spherical original image or a wide angle of view original image 501 of 4K, for example, so as to track the orientation of the head portion of the user, and cutting out a predetermined angle of view at the center position. The rendering device 300 moves the display region so as to cancel out the movement of the head portion that is detected by the head portion action tracking device 200 by rotating a region 502-1 according to the roll component of the motion of the head portion of the user, moving a region 502-2 according to the tilt component of the motion of the head portion of the user, and moving a region 502-3 according to the pan component of the motion of the head portion of the user. At the display device 400 side, it is possible to present an image in which the display region within the original image 501 moves so as to track the movement of the head portion of the user.

As illustrated in FIG. 5, in the image display system 100 according to the present embodiment, the position of the region that is cut out from within the original image in order to be displayed on the display device 400 moves according to the orientation information of the head portion of the user that is detected by the head portion action tracking device 200. Here, there is a problem of what size of angle of view to cut out at the position determined by the orientation information.

When a narrow angle of view is cut out, the user can focus on and observe a specific narrow region within the original image; however, the original image becomes blurred, and it is difficult for the user to ascertain which portion of the original image the user is viewing. Meanwhile, when a wide angle is cut out, it is easy for the user to ascertain which portion of the original image the user is viewing and to ascertain the nature of the original image; however, it is difficult to observe details.

Therefore, the image display system 100 according to the present embodiment is provided with a function of switching the angle of view to be displayed on the display device 400. The rendering device 300 cuts out the angle of view that is determined by the image switching function from a position within a full spherical image or a wide angle of view original image of 4K or the like. The position corresponds to the orientation information detected by the head portion action tracking device 200. Therefore, it is made possible for the user to efficiently view a wide angle image by switching to a narrow angle of view when the user wishes to focus on and observe a specific narrow region within the original image, and switching to a wide angle of view when the user wishes to understand the state of the original image in general.

Figure 6:
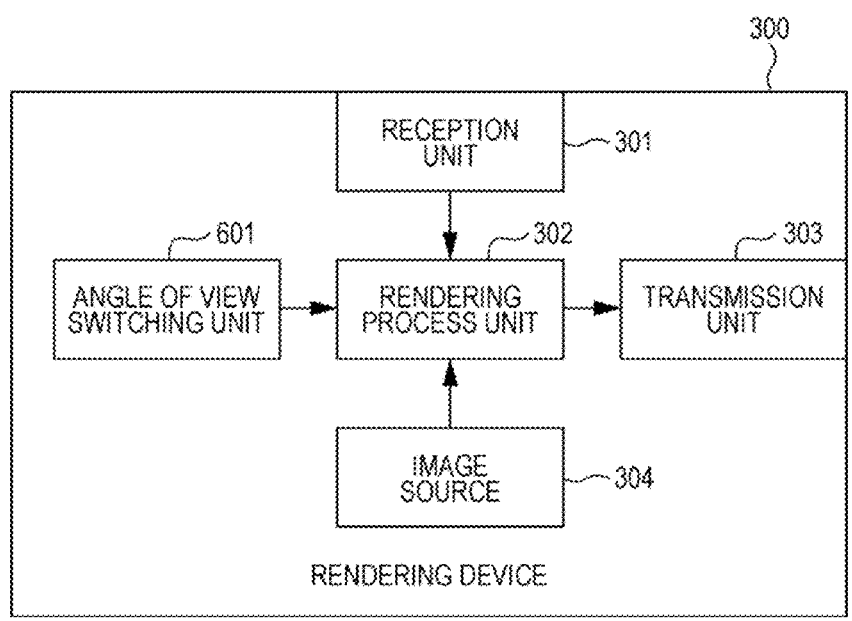
FIG. 6 is a diagram schematically illustrating the configuration of a rendering device provided with an angle of view switching function.

FIG. 6 schematically illustrates the configuration of the rendering device 300 provided with an angle of view switching function.

The angle of view switching unit 601 switches the angle of view of the image to be displayed on the display device 400 according to a predetermined procedure. For example, the angle of view may be switched according to a manual operation of the user. Alternatively, the angle of view may be switched automatically based on the display capabilities of the display device 400, or based on the features of the image to be displayed.

The rendering process unit 302 renders the image to be displayed by the display device 400 by cutting out an angle of view that is determined by the angle of view switching unit 601 at a position, which corresponds to the orientation information that is received by the reception unit 301, from a full spherical original image or a wide angle of view original image of 4K or the like that is supplied from the image source 304. The transmission unit 303 transmits the image data that is rendered by the rendering process unit 302 as it is in a non-compressed state to the display device 400.

Figure 7:
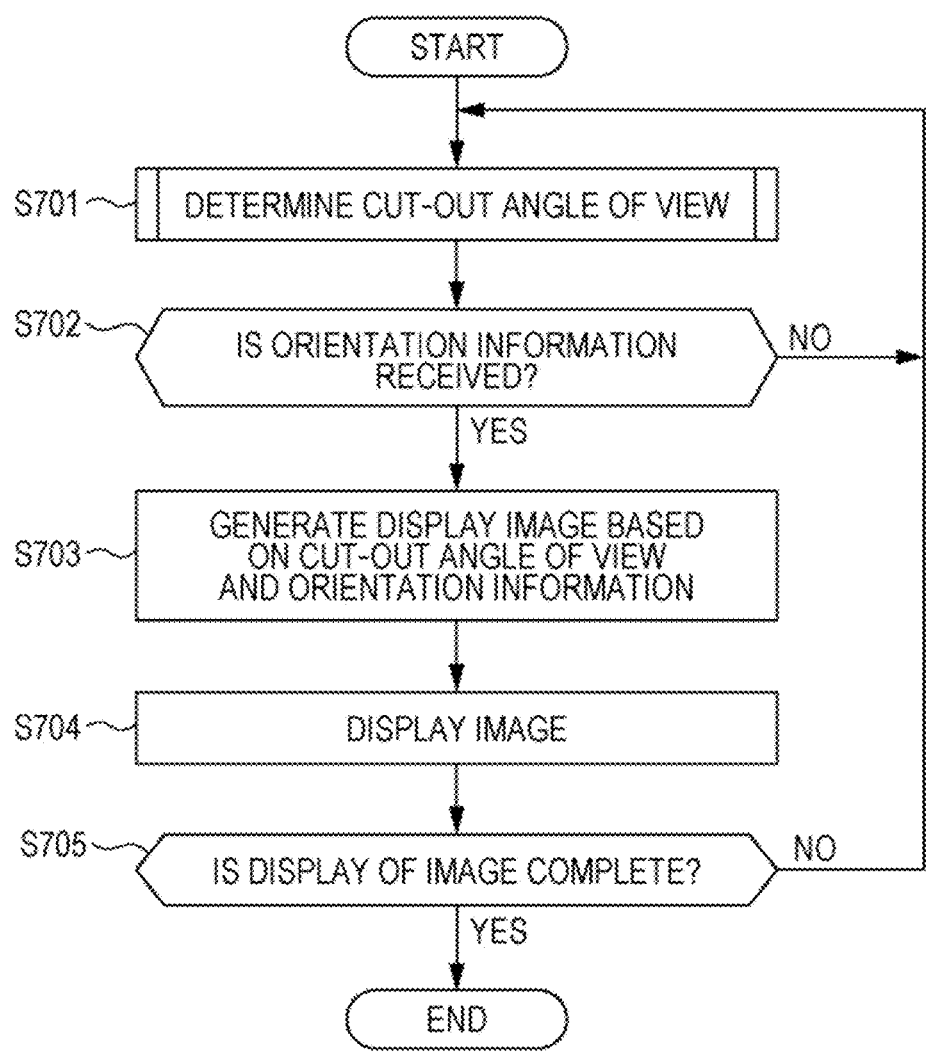
FIG. 7 is a flowchart illustrating the procedure of displaying an image on the display device while switching the display angle of view.

FIG. 7 illustrates, in flowchart format, the procedure of displaying the image on the display device 400 while switching the display angle of view in the image display system 100.

First, the angle of view switching unit 601 determines the angle of view to be cut out from the original image (step S701). The angle of view switching unit 601 is capable of switching the angle of view according to a manual operation of the user, and is capable of switching the angle of view automatically based on the display capabilities of the display device 400, or based on the features of the image to be displayed; however, the process of determining the cut-out angle of view will be described later in detail.

In the rendering device 300, when the orientation information of the head portion of the user is received by the reception unit 301 from the head portion action tracking device 200 (yes in step S702), the rendering process unit 302 renders the image to be displayed by the display device 400 by cutting out an image at an angle of view that is determined by the angle of view switching unit 601 from a position in the original image corresponding to the orientation information (step S703).

The rendered image is transmitted to the display device 400 from the transmission unit 303, and the display device 400 displays the received image on the display unit 402 (step S704).

The steps S701 to S704 described above are executed repeatedly until the display of the image is complete (no in step S705).

In step S701, the angle of view switching unit 601 can switch the angle of view according to a manual operation of the user. Therefore, the rendering device 300 may be provided with a user operation unit with which the user performs an input operation. When the rendering device 300 is configured as a multi-functional portable terminal such as a smart phone, for example, the user operation unit may be a touch panel. The angle of view switching unit 601 inputs the information of an input operation in relation to the user operation unit such as a touch operation of a user in relation to a touch panel, and switches the angle of view.

Figure 8:
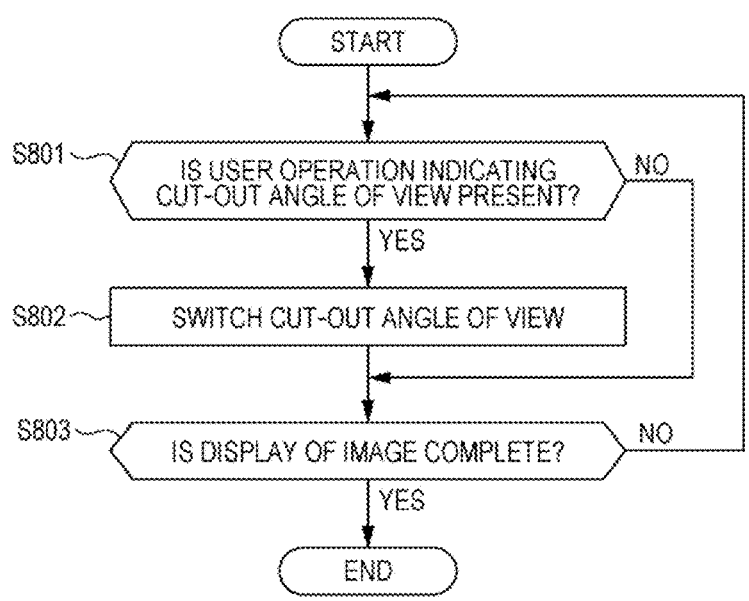
FIG. 8 is a flowchart illustrating the procedure of an angle of view switching unit switching the cut-out angle of view of an image according to a user operation.

FIG. 8 illustrates, in flowchart format, the procedure of the angle of view switching unit 601 switching the cut-out angle of view of the image according to a user operation in step S701.

When it is detected that a user operation indicating the switching of the cut-out angle of view is performed using the user operation unit such as a touch panel (yes in step S801), the angle of view switching unit 601 switches to a cut-out angle of view other than the angle of view that is presently set (step S802). Meanwhile, when the user operation is not detected (no in step S801), step S802 is skipped, and the switching of the angle of view is not performed. Subsequently, the process returns to step S801, and the switching process of the angle of view is executed repeatedly until the display of the image is complete (no in step S803).

Figure 9:
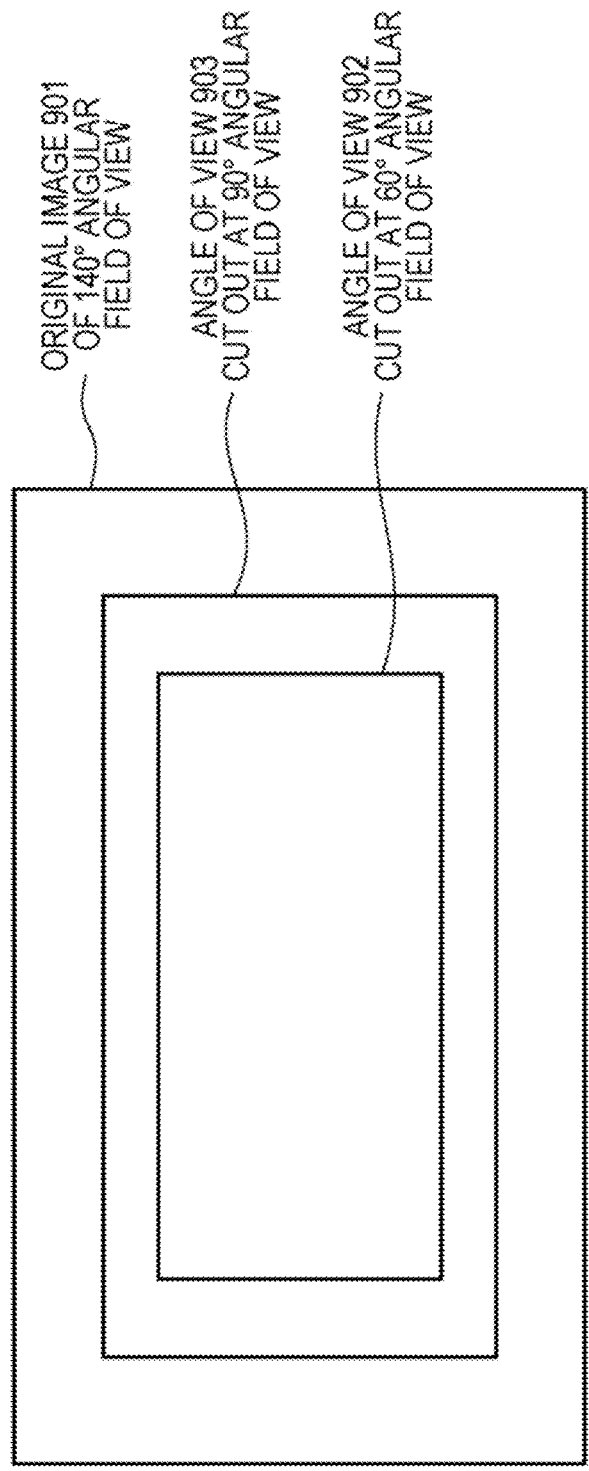
FIG. 9 is a diagram exemplifying the relationship between an angle of view of an original image and angles of view which are cut out.

FIG. 9 exemplifies angles of view that are cut out from the original image. In the example illustrated in FIG. 9, the angle of view of an original image 901 is set to an angular field of view of 140°. The rendering device 300 cuts out and renders either a first angle of view 902 with an angular field of view of 60°, or a second angle of view 903 with an angular field of view of 90° from the original image 901.

Figure 10:
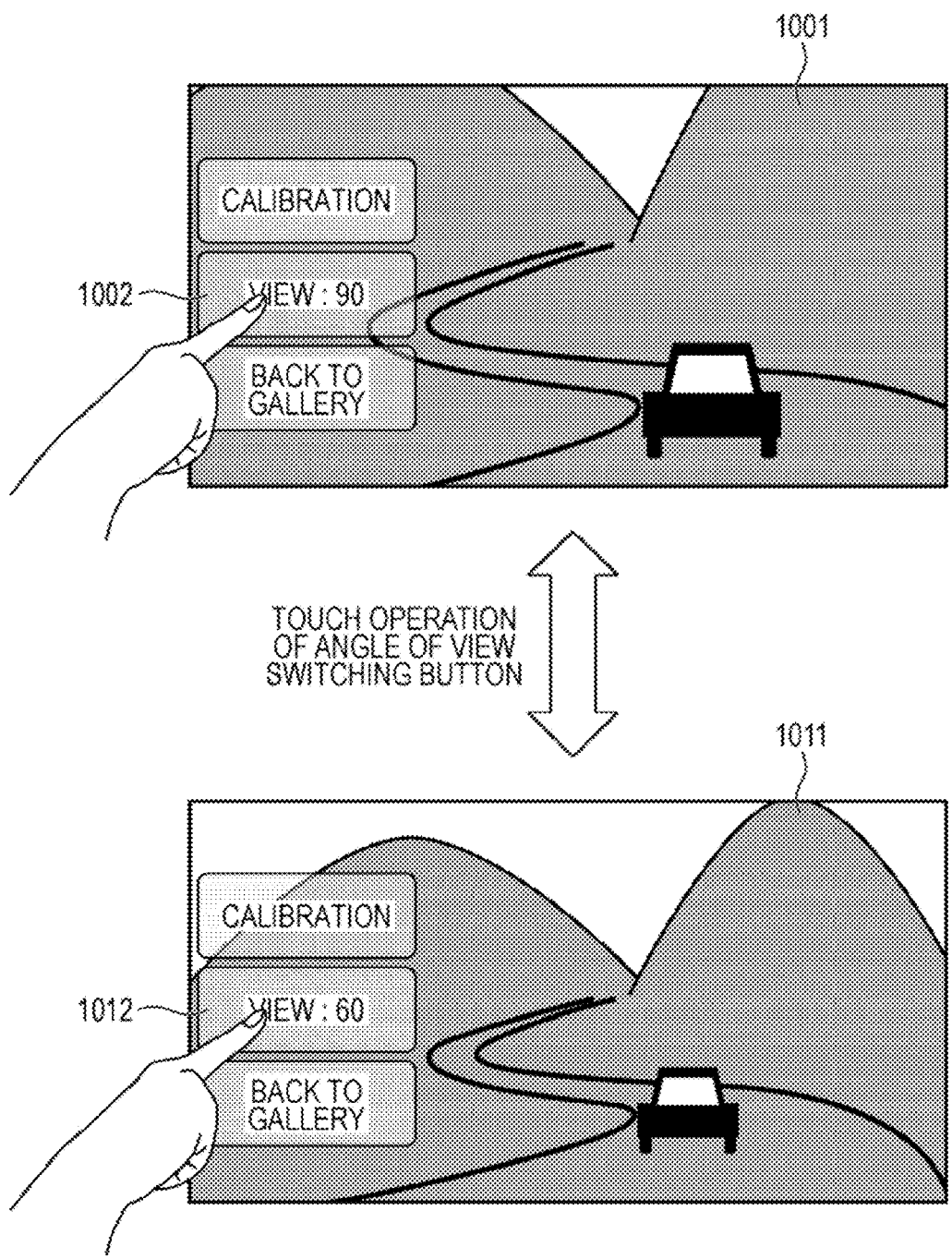
FIG. 10 is a diagram illustrating a screen transitioning due to an angle of view switching operation.

FIG. 10 illustrates a screen transitioning due to an angle of view switching operation. For example, when the user performs the angle of view switching operation using the touch panel, the angle of view switching unit 601 switches the angle of view that is cut out from the original image every time the user touches the touch panel. The rendering process unit 302 cuts out and renders images 1001 and 1011 at a position corresponding to the orientation information at the respective switched angles of view. In the example illustrated in FIG. 10, when the image 1001 that is cut out from the original image at the first angle of view with an angular field of view of 60° is displayed, when the user touches an angle of view switching button 1002, the display switches to the image 1011 that is cut out from the original image at the second angle of view with an angular field of view of 90°. When the image 1011 that is cut out at the second angle of view is displayed, when the user touches an angle of view switching button 1012, the display switches to the image 1001 that is cut out at the first angle of view. Every time the user touches the angle of view switching button 1002 or 1012, the angle of view switching unit 601 switches alternately between the first angle of view and the second angle of view.

It is not necessary to limit the first angle of view and the second angle of view to the specific angular fields of view of 60° and 90° as illustrated in FIGS. 9 and 10, and a configuration may be adopted in which the user can specify the angular field of view. For example, the narrow angular field of view and the wide angular field of view can be changed to angles other than 60° and 90°, respectively.

Alternatively, a configuration may be adopted in which the angle of view switching unit 601 automatically determines the candidates for the first angle of view and the second angle of view based on the display capabilities of the display device 400. For example, the angles of view can be determined based on the resolution of the display unit 402 of the display device 400, or based on the resolution of the original image.

Figure 11:
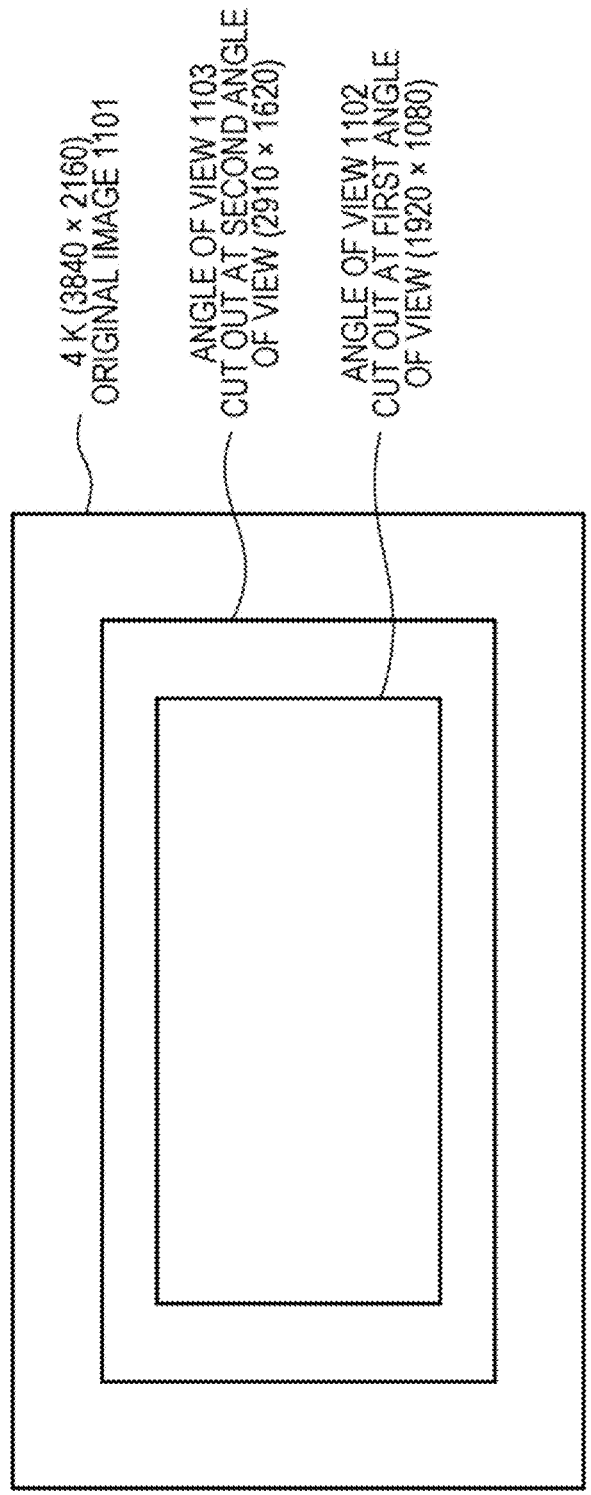
FIG. 11 is a diagram exemplifying candidates for a first angle of view and a second angle of view which are determined automatically based on the resolution of the display unit and the resolution of the original image.

FIG. 11 exemplifies candidates for the first angle of view and the second angle of view which are determined automatically based on the resolution of the display unit 402 of the display device 400 and the resolution of the original image. For example, consideration will be given to a case in which the original image 1101 with a resolution of 4K (3840×2160 pixels) is displayed at a full HD (1920×1080 pixels) resolution of the display unit 402. The limit to the cut-out range at which the image does not look blurred is 1920×1080 pixels. Therefore, one of the candidates for the resolution of the first angle of view 1102 is set to 1920×1080 pixels. In order to match the preferences of the user, 2910× 1620 pixels, which is between the resolution of the first angle of view 1102 and the resolution of the original image, is set as the resolution of a second angle of view 1103.

When the candidates of the cut-out angles of view are determined automatically based on the resolution of the display unit 402, it is necessary for the angle of view switching unit 601 of the rendering device 400 to acquire the resolution information of the display unit 402. For example, it is possible to use Extended Display Identification Data (EDID) as the file format which stores attribute information of the display device such as the resolution and frame rate of the images, the manufacturer identification information (Vendor ID), and product identification information (Product ID). The angle of view switching unit 601 can acquire EDID information using a transmission protocol such as Display Data Channel (DDC), for example. However, the angle of view switching unit 601 is not limited to a method using EDID or DDC.

Figure 12:
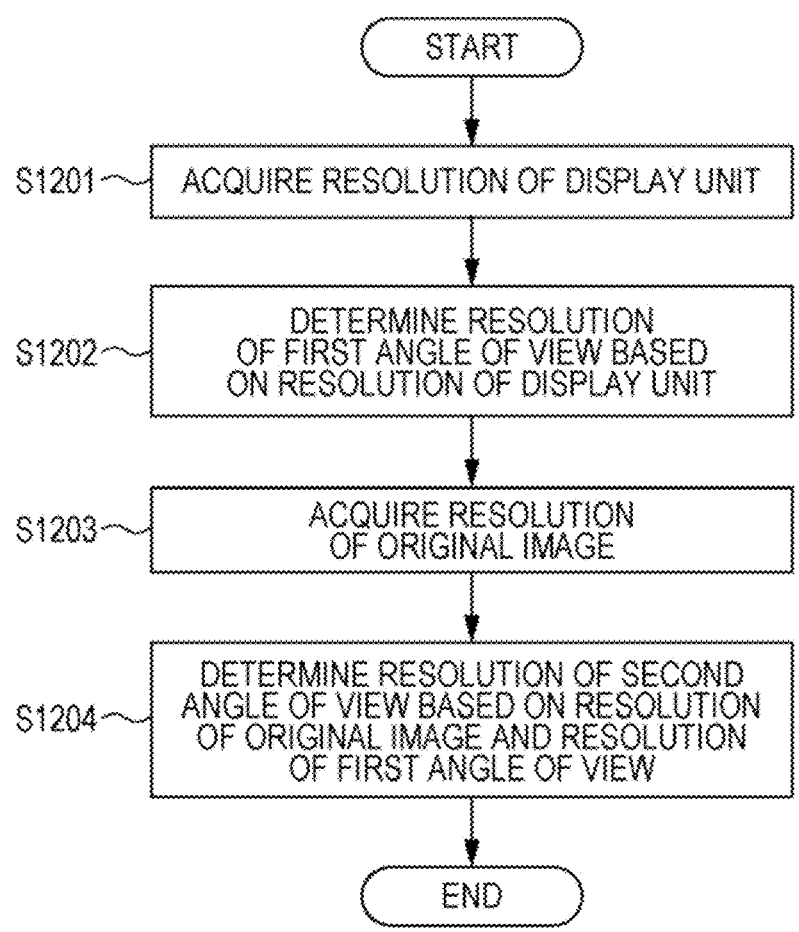
FIG. 12 is a flowchart illustrating the procedure for the angle of view switching unit to automatically determine the first angle of view and the second angle of view based on the resolution of the display unit of the display device and the resolution of the original image.

FIG. 12 illustrates, in flowchart format, the procedure for the angle of view switching unit 601 to automatically determine the first angle of view and the second angle of view based on the resolution of the display unit 402 of the display device 400 and the resolution of the original image.

The angle of view switching unit 601 acquires the resolution information of the display unit 402 of the display device 400 (step S1201), and determines the resolution of the first angle of view based on the resolution (step S1202). For example, the angle of view switching unit 601 determines the resolution of the display unit 402, which is the limit to the cut-out range at which the image does not look blurred, to be the resolution of the first angle of view.

Next, when the angle of view switching unit 601 acquires the resolution information of the original image (step S1203), the angle of view switching unit 601 determines the resolution of the second angle of view based on the resolution of the first angle of view and the resolution of the original image (step S1204). For example, the angle of view switching unit 601 determines the resolution of the second angle of view, which is between the resolution of the first angle of view and the resolution of the original image.

For example, the angle of view switching unit 601 sets the second angle of view as a "recommended angle of view" by default, and presents the image at the second angle of view; however, the angle of view switching unit 601 switches to the first angle of view according to a user operation of the touch panel or the like.

Figure 13:
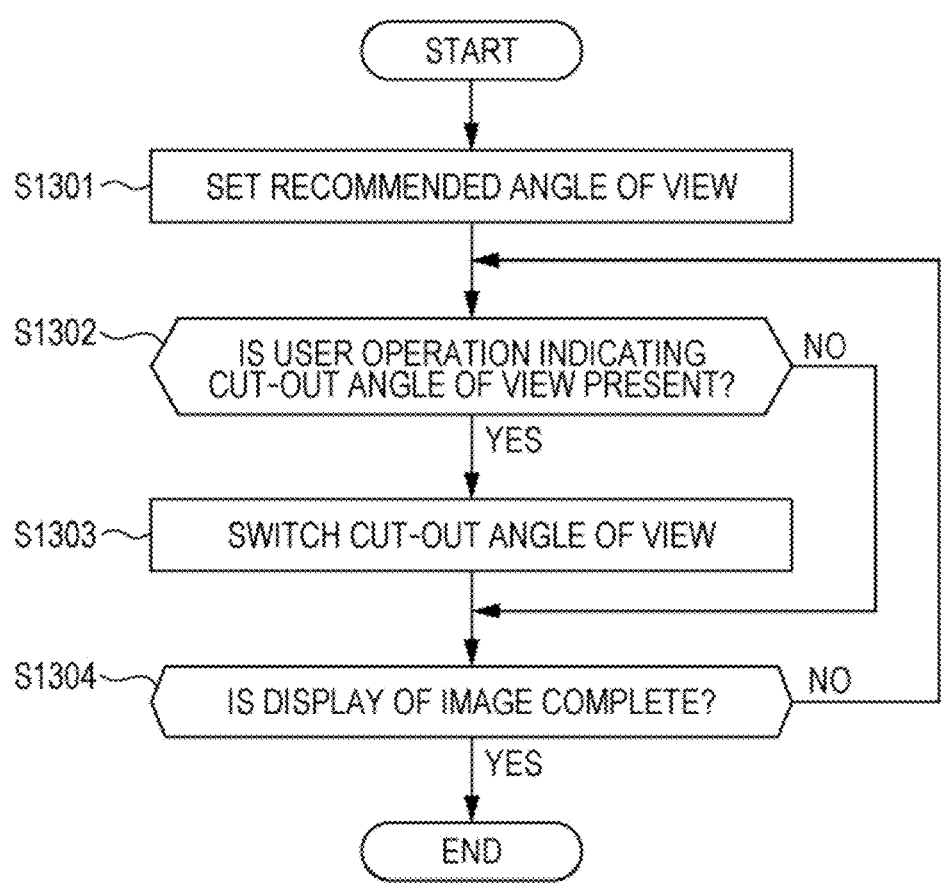
FIG. 13 is a flowchart illustrating the procedure of the angle of view switching unit setting a default recommended angle of view, and switching the cut-out angle of view of an image according to a user operation.

FIG. 13 illustrates, in flowchart format, the procedure of the angle of view switching unit 601 setting a default recommended angle of view, and switching the cut-out angle of view of an image according to a user operation in step S701.

The angle of view switching unit 601 sets the second angle of view, which is set to a resolution between the resolution of the first angle of view and the resolution of the original image based on the resolution of the display unit 401, as the recommended angle of view (step S1301).

Subsequently, when it is detected that a user operation indicating the switching of the cut-out angle of view is performed using the user operation unit such as a touch panel (yes in step S1302), the angle of view switching unit 601 switches to a cut-out angle of view other than the angle of view that is presently set (step S1303). Meanwhile, when the user operation is not detected (no in step S1302), step S1303 is skipped, and the switching of the angle of view is not performed. Subsequently, the process returns to step S1302, and the switching process of the angle of view described above is executed repeatedly until the display of the image is complete (no in step S1304).

The angle of view switching unit 601 may determine the angle of view automatically based on the features of the original image. For example, the angle of view switching unit 601 can determine the optimal angle of view by focusing on the objects contained in the original image. For example, it is possible to detect the objects contained in the image using an object detector formed of a collection of weak hypotheses relating to the luminance difference between two point pixels (for example, refer to Japanese Patent No. 4946730).

When the image is cut out at a narrow angle of view at the cut-out center position that is determined based on the orientation information of the head portion of the user, is becomes easy to observe the objects; however, there is a case in which the number of objects visible in the image is small, or the important objects fall outside of the angle of view. Meanwhile, when the image is cut out at a wide angle of view at the cut-out center position, a larger number of objects are incorporated in the image and it becomes easier to include the important objects in the angle of view; however, the image becomes complicated with a large number of objects, and it becomes difficult to observe the individual objects. There are various objects such as people, animals such as pets, plants, vehicles such as automobiles (for example, racing cars driving round a circuit), and buildings.

Figure 14:
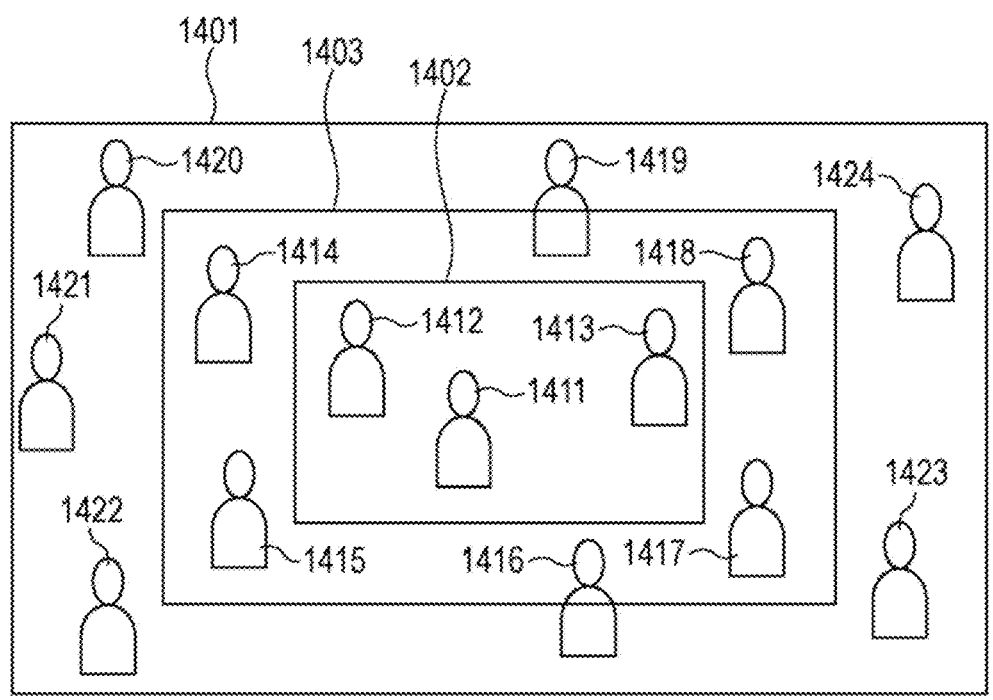
FIG. 14 is a diagram exemplifying a situation in which the number of objects changes depending on the size of an angle of view at the same center position.

FIG. 14 exemplifies a situation in which the number of objects changes depending on the size of an angle of view at the same center position. In FIG. 14, the objects are people to facilitate explanation. In an original image 1401, 14 people, objects 1411 to 1424, are visible. Only three people, the objects 1411 to 1413, are contained within the narrow angle of view indicated by a reference numeral 1402. When the wide angle of view indicated by a reference numeral 1403 is set at the same cut-out center position, a further five people, the objects 1414 to 1418, are contained in the angle of view, and a total of eight people, the objects, are visible.

Since, when the angle of view of widened to the angle of view 1403, the number of objects is sufficient, this is the optimal angle of view.

The angle of view switching unit 601 sequentially obtains the total number of objects contained in the angle of view while changing the size of the angle of view at a cut-out center position that is determined according to the orientation information of the head portion of the user. For example, the angle of view switching unit 601 is configured to automatically set the smallest angle of view at which the total number of objects exceeds a predetermined value.

Figure 15:
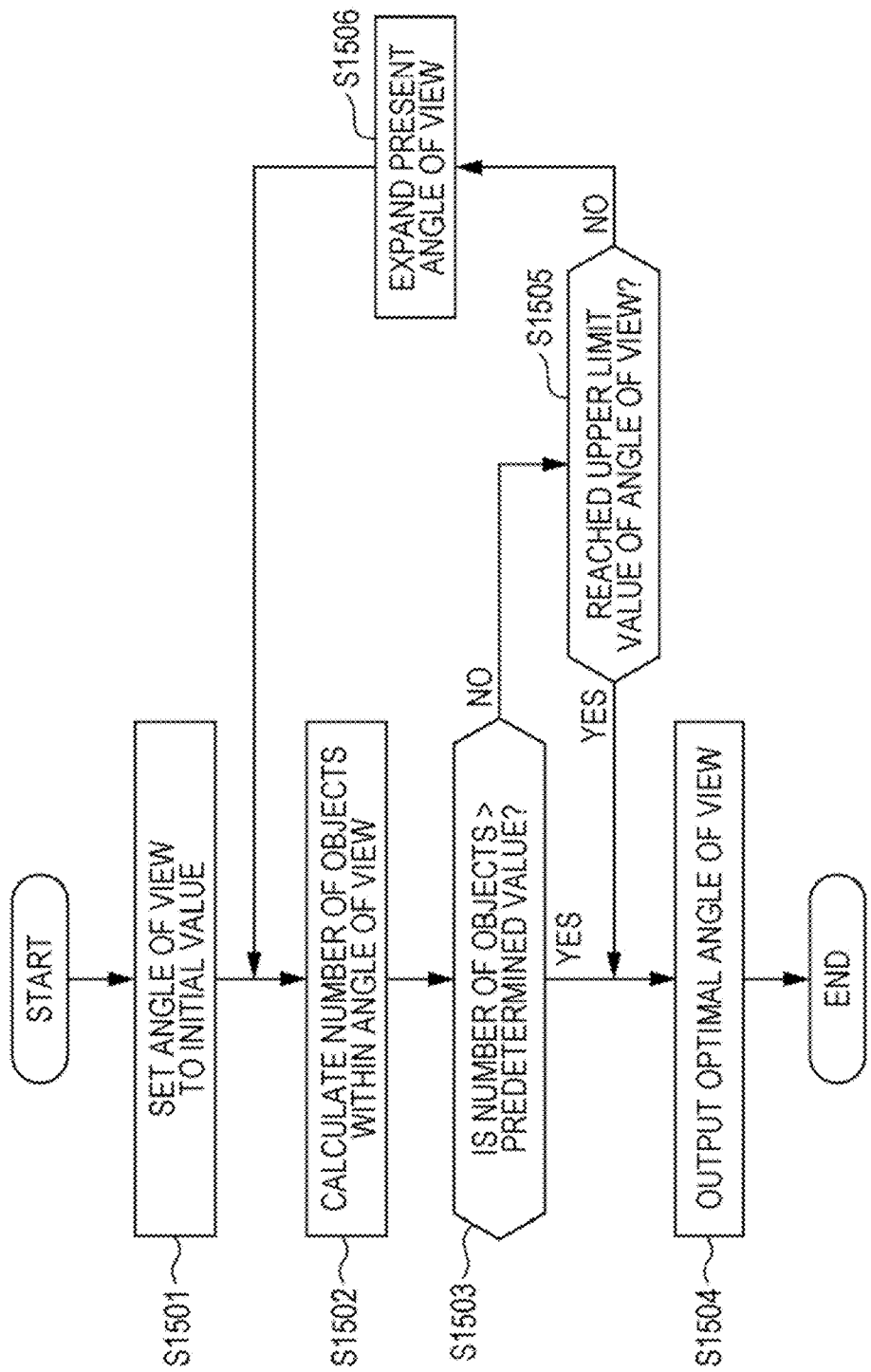
FIG. 15 is a flowchart illustrating the procedure for the angle of view switching unit to determine an angle of view that is optimal for the original image based on the total number of objects.

FIG. 15 illustrates, in flowchart format, the procedure for the angle of view switching unit 601 to determine an angle of view that is optimal for the original image based on the total number of objects.

First, the angle of view switching unit 601 sets the angle of view to an initial value (step S1501).

The angle of view switching unit 601 calculates the number of objects contained in the present angle of view (step S1502), and checks whether or not the total number of objects exceeds the predetermined value (step S1503). The predetermined value may be a value that is determined in advance or a value that is set by the user. Alternatively, the predetermined value may be determined based on a proportion (for example, one third) in relation to the total number of objects contained in the entire original image.

When the total number of objects exceeds the predetermined value (yes in step S1503), the present angle of view is output as the optimal angle of view (step S1504), and the present processing routine ends.

Meanwhile, when the total number of objects is less than the predetermined value (no in step S1503), it is checked whether or not the present angle of view has reached the upper limit value of the angle of view (step S1505).

When the present angle of view reaches the upper limit value (yes in step S1505), the process stops trying to increase the number of objects in the angle of view, outputs the present angle of view as the optimal angle of view (step S1504), and the present processing routine ends.

If the present angle of view is less than the upper limit value (no in step S1505), after the present angle of view is expanded by only a predetermined amount (step S1506), the process returns to step S1502, and the process of searching for the optimal angle of view is executed repeatedly.

Alternatively, the angle of view switching unit 601 may be configured to obtain the weighted sum of the objects contained in the angle of view at the cut-out center position, and to automatically set the smallest angle of view at which the total value exceeds the predetermined value. Here, "weight" indicates the importance of the object. If the object is a person, the weight values are allocated based on the degree of intimacy to the user observing the image, such as close relatives, friends, superiors, and colleagues of the user. Alternatively, the user may set the weight of each object themselves. Naturally, the angle of view switching unit 601 may determine the angle of view based on feature values of the original image other than the objects.

Figure 16:
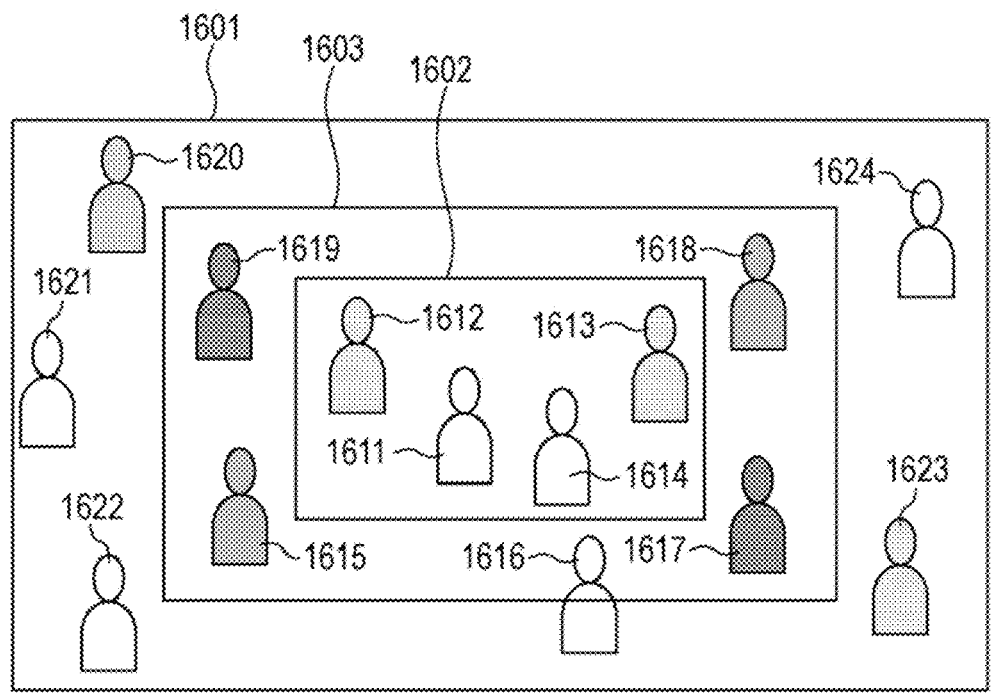
FIG. 16 is a diagram illustrating the importance of objects contained in the original image using gradients.

FIG. 16 illustrates the importance of objects 1611 to 1624 contained in an original image 1601 using gradients (the darker the color used to depict the object, the higher the importance). Four people, the objects 1611 to 1614, are contained within the narrow angle of view indicated by a reference numeral 1602, which may be sufficient from perspective of the number of objects; however, the importance is not high. Meanwhile, when the angle of view is widened to that of the width indicated by a reference numeral 1603, since a further four people, the objects 1615 to 1618, are included and it is possible to incorporate the important objects, the angle of view is optimal.

FIG. 17 illustrates, in flowchart format, the procedure for the angle of view switching unit 601 to determine an angle of view that is optimal for the original image based on a total value which is a weighted sum of the objects.

First, the angle of view switching unit 601 sets the angle of view to an initial value (step S1701).

The angle of view switching unit 601 obtains the weighted sum of the objects contained in the present angle of view (step S1702), and checks whether or not the total value exceeds the predetermined value (step S1703).

When the weighted sum value of the objects exceeds the predetermined value (yes in step S1703), the present angle of view is output as the optimal angle of view (step S1704), and the present processing routine ends.

Meanwhile, when the weighted sum value of the objects is less than the predetermined value (no in step S1703), it is checked whether or not the present angle of view has reached the upper limit value of the angle of view (step S1705).

When the present angle of view reaches the upper limit value (yes in step S1705), the process stops trying to increase the number of objects in the angle of view, outputs the present angle of view as the optimal angle of view (step S1704), and the present processing routine ends.

If the present angle of view is less than the upper limit value (no in step S1705), after the present angle of view is expanded by only a predetermined amount (step S1706), the process returns to step S1702, and the process of searching for the optimal angle of view is executed repeatedly.

In this manner, in the present embodiment, the angle of view of an image to be cut out from a position corresponding to the orientation information of the head portion of the user in a full spherical image or a wide angle original image such as a 4K image is switched as appropriate. Therefore, the user can efficiently view a wide angle image by switching to a narrow angle of view when the user wishes to focus on and observe a specific narrow region within the original image, and switching to a wide angle of view when the user wishes to understand the state of the original image in general.

An embodiment of the technology disclosed in the present specification is particularly valid when the head portion action tracking device 200 is provided as an optional product that is externally attached to the display device 400 which is configured as a head mounted display; however, naturally, even when the head portion action tracking device 200 is installed inside the main body portion 41 of the display device 400, it is possible to apply an embodiment of the technology disclosed in the present specification in the same manner. Even when the display device 400 is a product other than a head mounted display, it is possible to apply an embodiment of the technology disclosed in the present specification in the same manner when reproducing an image which tracks the movement of the head portion of the user.

In other words, description is given of an embodiment of the technology disclosed in the present specification using exemplary embodiments, and the content described in the present specification should not be interpreted restrictively. In order to determine the main concept of an embodiment of the technology disclosed in the present specification, it is preferable to refer to the claims.

Note that, an embodiment of the technology disclosed in the present specification may be configured as described below.

(1) An image processing device includes an orientation information acquisition unit which acquires orientation information of a head portion of a user that observes a display image of a display device; an angle of view switching unit which switches an angle of view of the display image; a rendering process unit which generates the display image based on the orientation information and the angle of view; and a transmission unit which transmits the generated image to the display device.

(2) The image processing device according to (1), in which the display device is used fixed to a head portion or a face portion of the user.

(3) The image processing device according to one of (1) or (2), in which the orientation information acquisition unit receives the orientation information from an orientation detection device which detects an orientation of the head portion of the user.

(4) The image processing device according to any one of (1) to (3), in which the rendering process unit generates the display image by cutting out a region corresponding to the angle of view from a position corresponding to the orientation information of an original image.

(5) The image processing device according to any one of (1) to (4) includes a user operation unit which the user operates; in which the angle of view switching unit switches the angle of view according to an operation performed by the user in relation to the user operation unit.

(6) The image processing device according to (5), in which the user operation unit includes a touch panel, and in which the angle of view switching unit switches the angle of view according to a touch operation performed by the user in relation to the touch panel.

(7) The image processing device according to (6), in which the angle of view switching unit switches alternately to one of a first angle of view and a second angle of view every time the user touches the touch panel.

(8) The image processing device according to (7), in which the angle of view switching unit sets the first angle of view and the second angle of view to fixed values.

(9) The image processing device according to (7), in which the angle of view switching unit determines the first angle of view based on a resolution of the display device, and determines the second angle of view based on the resolution of the display device and the resolution of an original image to be processed by the rendering process unit.

(10) The image processing device according to any one of (1) to (6), in which the angle of view switching unit determines an angle of view based on feature values of an original image.

(11) The image processing device according to (10), in which the angle of view switching unit determines the smallest angle of view at which a total number of objects exceeds a predetermined value.

(12) The image processing device according to (10), in which the angle of view switching unit determines the smallest angle of view at which a weighted sum value of objects exceeds a predetermined value.

(13) An image processing method includes acquiring orientation information of a head portion of a user that observes a display image of a display device; switching an angle of view of the display image; generating the display image based on the orientation information and the angle of view; and transmitting the generated image to the display device.

(14) A display device includes a display unit; an orientation information acquisition unit which acquires orientation information of a head portion of a user that observes a display image of the display unit; an angle of view switching unit which switches an angle of view of the display image; and a rendering process unit which generates the display image based on the orientation information and the angle of view.

(15) The display device according to (14) further includes a user operation unit which the user operates; in which the angle of view switching unit switches the angle of view according to an operation performed by the user in relation to the user operation unit.

(16) The display device according to (15), in which the angle of view switching unit switches alternately to one of a first angle of view and a second angle of view every time a user operation is performed.

(17) A display method includes acquiring orientation information of a head portion of a user that observes a display image of a display unit; switching an angle of view of the display image; and generating the display image based on the orientation information and the angle of view.

(18) A computer program denoted in a computer readable format for causing a computer to function as an orientation information acquisition unit which acquires orientation information of a head portion of a user that observes a display image of a display device; an angle of view switching unit which switches an angle of view of the display image; a rendering process unit which generates the display image based on the orientation information and the angle of view; and a transmission unit which transmits the generated image to the display device.

(19) A computer program denoted in a computer readable format for causing a computer to function as a display unit; an orientation information acquisition unit which acquires orientation information of a head portion of a user that observes a display image of the display unit; an angle of view switching unit which switches an angle of view of the display image; and a rendering process unit which generates the display image based on the orientation information and the angle of view.

(20) An image display system includes a display device which displays an image; a head portion action tracking device which measures an orientation of a head portion of a user that observes a display image of the display device; and a rendering device which switches an angle of view at which the display device displays an image, and generates an image based on the orientation information and the angle of view.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
  an orientation information acquisition unit configured to acquire orientation information of a head portion of a user associated with a display device,
    wherein the display device displays a first display image;
  an angle of view switching unit configured to switch an angle of view of the first display image;
  a rendering process unit configured to generate a second display image, from the first display image, based on the orientation information and the angle of view,
    wherein the second display image comprises a plurality of objects, and
    wherein a number of the plurality of objects is greater than a first threshold; and a transmission unit configured to transmit the second display image to the display device.

2. The image processing device according to claim 1, wherein the display device is worn on one of the head portion or a face portion of the user.

3. The image processing device according to claim 1, further comprising an orientation detection device configured to detect an orientation of the head portion of the user, and
wherein the orientation information acquisition unit is further configured to receive the orientation information from an orientation detection device.

4. The image processing device according to claim 1, wherein the rendering process unit is further configured to generate the second display image based on a cut out region, and
wherein the cut out region corresponds to the angle of view from a position corresponding to the orientation information of an original image.

5. The image processing device according to claim 1, further comprising:
a user operation unit configured to detect a user operation;
wherein the angle of view switching unit is further configured to switch the angle of view based on the user operation.

6. The image processing device according to claim 5, wherein the user operation unit includes a touch panel, and
wherein the angle of view switching unit is further configured to switch the angle of view based on a touch operation on the touch panel.

7. The image processing device according to claim 6, wherein the angle of view switching unit is further configured to alternately switch, to one of a first angle of view or a second angle of view, based on the touch operation.

8. The image processing device according to claim 7, wherein the angle of view switching unit is further configured to set the first angle of view and the second angle of view to fixed values.

9. The image processing device according to claim 7, wherein the angle of view switching unit is further configured to:
determine the first angle of view based on a first resolution of the display device, and
determine the second angle of view based on:
the first resolution of the display device, and
a second resolution of an original image processed by the rendering process unit.

10. The image processing device according to claim 1, wherein the angle of view switching unit is further configured to determine the angle of view based on feature values of an original image.

11. The image processing device according to claim 10, wherein the angle of view switching unit is further configured to determine a smallest angle of view at which the number of the plurality of objects, in the second display image, is greater than the first threshold.

12. The image processing device according to claim 10, wherein the angle of view switching unit is further configured to determine a smallest angle of view at which a weighted sum value of the plurality of objects, in the second display image, is greater than a second threshold.

13. An image processing method, comprising:
acquiring orientation information of a head portion of a user associated with a display device,
wherein the display device displays a first display image;
switching an angle of view of the first display image;
generating a second display image, from the first display image, based on the orientation information and the angle of view,
wherein the second display image comprises a plurality of objects, and
wherein a number of the plurality of objects is greater than a first threshold; and
transmitting the second display image to the display device.

14. A display device, comprising:
a display unit configured to display a first display image;
an orientation information acquisition unit configured to acquire orientation information of a head portion of a user;
an angle of view switching unit configured to switch an angle of view of the first display image; and
a rendering process unit configured to generate a second display image, from the first display image, based on the orientation information and the angle of view,
wherein the second display image comprises a plurality of objects, and
wherein a number of the plurality of objects is greater than a first threshold.

15. The display device according to claim 14, further comprising:
a user operation unit configured to detect a user operation;
wherein the angle of view switching unit is further configured to switch the angle of view based on the user operation.

16. The display device according to claim 15, wherein the angle of view switching unit is further configured to alternately switch to one of a first angle of view or a second angle of view based on the user operation.

17. A display method, comprising:
acquiring orientation information of a head portion of a user associated with a display unit,
wherein the display unit displays a first display image;
switching an angle of view of the first display image; and
generating a second display image, from the first display image, based on the orientation information and the angle of view,
wherein the second display image comprises a plurality of objects, and
wherein a number of the plurality of objects is greater than a first threshold.

18. A non-transitory computer-readable medium, having stored thereon computer-executable instructions that, when executed by a computer, cause the computer to execute operations, the operations comprising:
acquire orientation information of a head portion of a user associated with a display device,
wherein the display device displays a first display image;
switch an angle of view of the first display image;
generate a second display image, from the first display image, based on the orientation information and the angle of view,
wherein the second display image comprises a plurality of objects, and
wherein a number of the plurality of objects is greater than a first threshold; and
transmit the second display image to the display device.

19. A non-transitory computer-readable medium, having stored thereon computer-executable instructions that, when executed by a computer, cause the computer to execute operations, the operations comprising:

acquire orientation information of a head portion of a user associated with a display unit,
wherein the display unit displays a first display image;
switch an angle of view of the first display image; and
generate a second display image, from the first display image, based on the orientation information and the angle of view,
wherein the second display image comprises a plurality of objects, and
wherein a number of the plurality of objects is greater than a first threshold.

20. An image display system, comprising:
a display device configured to display a first display image;
a head portion action tracking device configured to measure an orientation of a head portion of a user; and
a rendering device configured to:
switch an angle of view at which the display device displays the first display image, and
generate a second display image, from the first display image, based on the orientation and the angle of view,
wherein the second display image comprises a plurality of objects, and
wherein a number of the plurality of objects is greater than a first threshold.

* * * * *